(12) United States Patent
Lin

(10) Patent No.: US 10,014,765 B2
(45) Date of Patent: Jul. 3, 2018

(54) SINGLE STAGE POWER FACTOR CORRECTION CONVERTER

(71) Applicant: Fuxiang Lin, Lidcombe (AU)

(72) Inventor: Fuxiang Lin, Lidcombe (AU)

( * ) Notice: Subject to any disclaimer, the term of this patent is extended or adjusted under 35 U.S.C. 154(b) by 0 days.

(21) Appl. No.: 15/349,878

(22) Filed: Nov. 11, 2016

(65) Prior Publication Data

US 2018/0138809 A1    May 17, 2018

(51) Int. Cl.
*H02M 1/42* (2007.01)
*H02M 1/14* (2006.01)
*H02M 3/335* (2006.01)

(52) U.S. Cl.
CPC ............ *H02M 1/42* (2013.01); *H02M 1/14* (2013.01); *H02M 3/33523* (2013.01)

(58) Field of Classification Search
CPC ....... H02M 1/42; H02M 3/33523; H02M 1/14
USPC .................................... 363/21.16, 21.12, 17
See application file for complete search history.

(56) References Cited

U.S. PATENT DOCUMENTS

| 7,280,374 | B1* | 10/2007 | Huang | H02M 1/4258 363/16 |
| 7,532,489 | B2* | 5/2009 | Lin | H02M 1/34 363/21.04 |
| 9,071,161 | B2* | 6/2015 | Lin | H02M 1/4258 |
| 9,118,257 | B2* | 8/2015 | Lin | H02M 1/42 |
| 9,130,472 | B2* | 9/2015 | Lin | H02M 1/4258 |
| 9,413,226 | B1* | 8/2016 | Lin | H02M 1/4258 |
| 2007/0263417 | A1* | 11/2007 | Lin | H02M 1/4258 363/21.12 |
| 2009/0091961 | A1* | 4/2009 | Hsia | H02M 1/4258 363/127 |
| 2014/0071716 | A1* | 3/2014 | Lin | H02M 1/4258 363/21.04 |
| 2014/0233264 | A1* | 8/2014 | Lin | H02M 1/4258 363/17 |
| 2015/0085535 | A1* | 3/2015 | Lin | H02M 1/42 363/21.02 |
| 2015/0162842 | A1* | 6/2015 | Lin | H02M 1/4258 363/21.02 |
| 2015/0222177 | A1* | 8/2015 | Lin | H02M 1/4258 307/52 |

OTHER PUBLICATIONS

Received STIC search report from EIC 2800 searcher Mesfin Getaneh dated Jul. 3, 2017.*

* cited by examiner

*Primary Examiner* — Timothy J Dole
*Assistant Examiner* — Htet Z Kyaw

(57) ABSTRACT

A single-stage power factor correction power supply has two transformers: a main transformer and an auxiliary transformer (fly-back transformer). The main transformer transfers energy from the primary circuit to the secondary circuit. The auxiliary transformer is used to correct input current waveform. A fill-valley circuit is used to stored energy when the input voltage is higher than the voltage across bulk capacitors in the fill-valley circuit and to release energy when the input voltage is lower than the voltage across the bulk capacitors in fill-valley circuit. A small capacitance value capacitor is used to improve input current waveform.

7 Claims, 2 Drawing Sheets

SINGLE STAGE POWER FACTOR CORRECTION CONVERTER

The present invention relates to a power converter, and more particularly, to a power factor correction (PFC) converter in a single stage.

DESCRIPTION OF THE RELATED ART

Power converters have widely served to convert an unregulated power source to a regulated voltage or current. A PFC (Power Factor Correction) technique is applied to make an input current follow the waveform of an input voltage. Adding a PFC stage to the front end of a power converter substantially avoids unnecessary power loss and heat dissipation in a power contribution system.

A traditional PFC power converter has two stages. A first stage is PFC stage, which includes an inductor, a rectifier and a transistor which is driven by a PFC control signal from the PFC stage. A second stage includes a transistor controlled by a control signal PWM, a transformer and a secondary circuitry, thus output voltage is regulated and output ripple noise is reduced. However, the PFC stage configuration increases the cost and the device counts of the converter, and hence the efficiency of power converter is reduced. Therefore, the development trend of a power converter is to build a single stage power converter with PFC function.

The present invention provides a simple method by adding a fly-back transformer, a diode and a fill-valley circuit. The present invention also provides a method to reduce energy that is used to correct input current waveform. The present invention can further provide a power converter operating in lower stress to obtain higher reliability.

SUMMARY OF THE INVENTION

The first objective of the present invention is to provide a switching power supply that operates from AC line voltage and has power factor correction and output isolation.

The second objective of the present invention is to provide a one stage power factor correction in an AC to DC converter.

The third objective of the present invention is to provide a simple circuit of PFC power supply to reduce the manufacture cost.

The fourth objective of the present invention is to provide a more efficient PFC power supply circuit.

Further objects and advantages of the present invention will be apparent from the following detailed description of a presently preferred embodiment, which is illustrated, schematically, in the accompanying drawings.

DESCRIPTION OF THE PREFERRED EMBODIMENT

Before explaining the disclosed embodiment of the present invention in detail, it is to be understood that the invention is not limited in its application to the details of the particular arrangements shown since the invention is capable of other embodiments. The topology of the present invention is that a transformer's first winding is connected in series with a main transformer's primary winding and The main transformer transfers power from the primary circuit to the secondary circuit and the fly-back transformer transfers power to its second winding of the fly-back transformer to correct the input current waveform. The fill-valley circuit provides the energy to power converter unit when the input voltage is lower than the voltage across capacitors in the fill-valley circuit.

Figure 1:
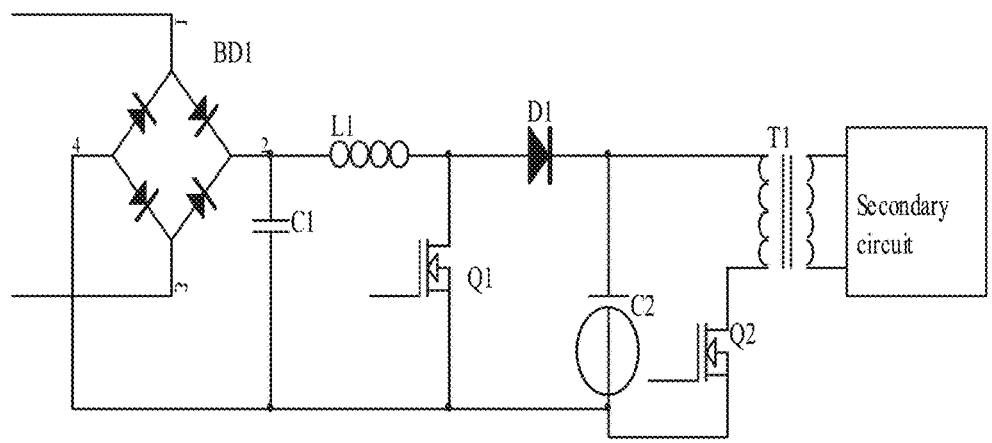
FIG. 1 is a schematic diagram of the prior art.
Figure 2:
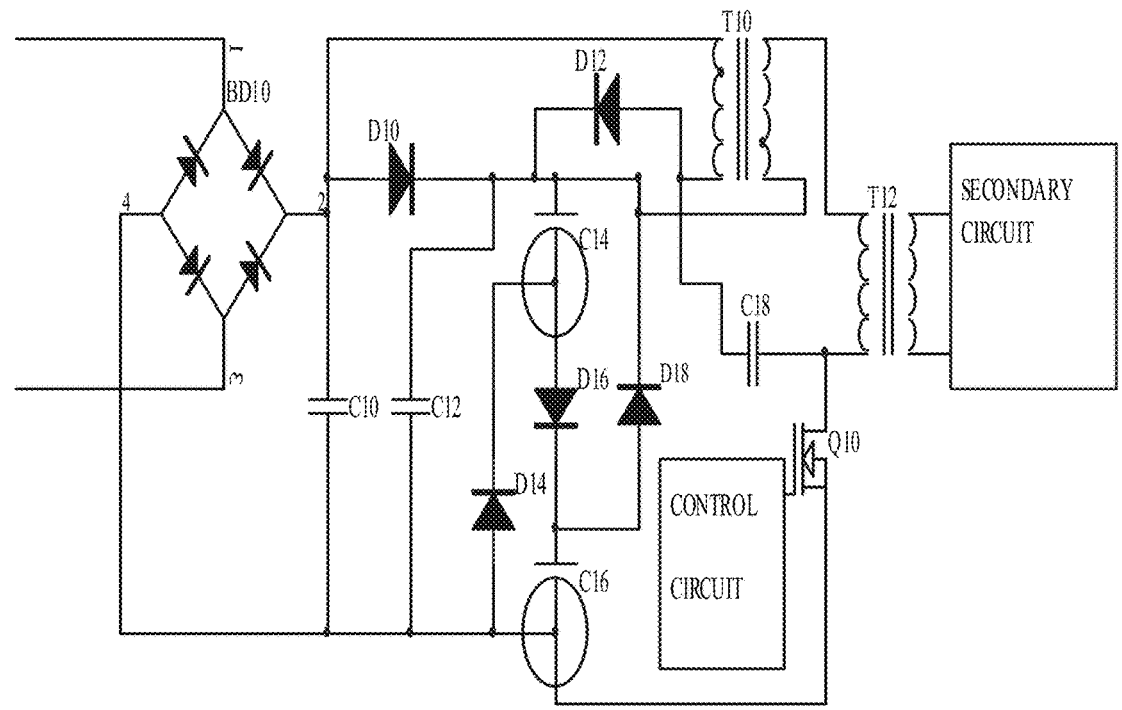
FIG. 2 is a schematic diagram of the present invention of a single stage power factor correction converter.
Figure 3:
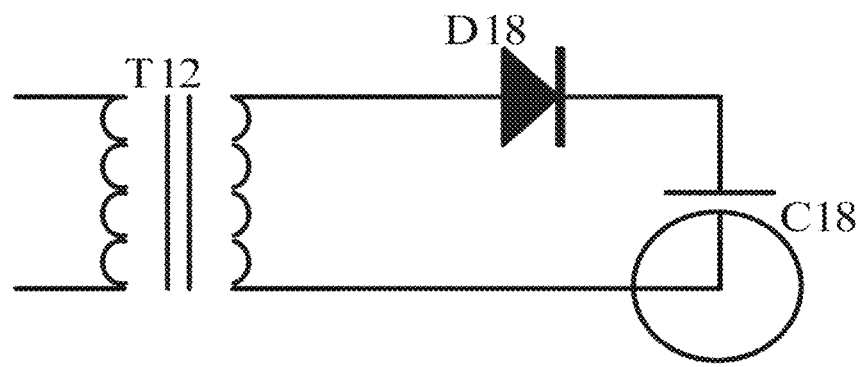
FIG. 3 is a secondary circuit of a fly-back converter in accordance with the present invention.

Refer to FIG. 2:

It illustrates the circuit diagram of a single switch power factor correction fly-back converter according to the present invention. The circuit is configured as following:

A full bridge rectifier BD10 has output terminals (a positive terminal and a negative terminal) and input terminals which are coupled to AC power lines.

A first capacitor C10 is connected to the output terminals of the full bridge rectifier BD10.

A first diode D10, the anode of the first diode connected to the positive output terminal of the bridge rectifier BD10.

A fly-back transformer T10 has two windings: a first winding and a second winding, the first terminal of the first winding is connected to the positive output terminal of the full bridge rectifier BD10.

A second diode D12, the anode of the second diode is connected to the second terminal of the first winding of the fly-back transformer T10 and the cathode of the second diode D12 is connected to the cathode of the first diode D10

A second capacitor C12 is connected between the cathode of the first diode D10 and the negative output of the bridge rectifier BD10.

A third diode D14, the anode of the third diode D14 is connected to the negative output of the bridge rectifier BD10.

A third capacitor C14 has two terminal: a positive terminal and a negative terminal. The positive terminal of the third capacitor C14 is connected to the cathode of the first diode D12 and the negative terminal of the third capacitor C14 is connected to the cathode of the third diode D14.

A fourth diode D16, the anode of the fourth diode D16 is connected to the negative terminal of the third capacitor C14.

A fourth capacitor C14 has two terminals: a positive terminal and a negative terminal; the positive terminal of the fourth capacitor C16 is connected to the cathode of the fourth diode D16 and the the negative terminal of the fourth capacitor C16 is connected to the negative output of the bridge rectifier BD10.

A fifth diode D18, the anode of the fourth diode D18 is connected to the positive terminal of the fourth capacitor C16 and cathode of the fifth diode D18 is connected to the positive terminal of the third capacitor C14.

A main transformer T12 has two windings: a primary winding and a secondary winding. The primary winding of the main transformer T12 is connected to the second winding of the fly-back transformer T10 in series. The secondary winding of the main transformer T12 is coupled to a secondary circuitry. The main transformer T12 is a fly-back transformer.

A switch Q10 has three terminals: a first terminal, a second terminal and a control terminal. The second terminal of the switch Q10 is connected to the negative output of the bridge rectifier BD10, the control terminal is coupled to a control Unit. The series circuit of the second winding of the fly-back transformer T10 and primary winding of the main transformer T12 is connected between the positive terminal of the third capacitor C12 and the first terminal of the switch Q10.

A fifth capacitor C18 is connected between the positive output of the bridge rectifier BD10 and the first terminal of the switch Q10.

The operation of the FIG. 2 is following:

when the input voltage is higher than the voltage across the third capacitor C14 or the fourth capacitor C16

When switch Q10 is on, a current discharged from the fifth capacitor C18 conducts through the first winding of the fly-back transformer T10 and the switch Q10; a current drawn from input conducts through the first diode D10, the second winding of the fly-back transformer T10, the main transformer T12 and the switch Q10.

When switch Q10 is off, there is an induced voltage in the fly-back transformer T10, this voltage and input voltage force a current to charge the third capacitor C14 and fourth C16 through the second diode D12, the first winding of the fly-back transformer T10 and the third diode D16.

when the input voltage is lower than the voltage across the third capacitor C14 or across the fourth capacitor C16.

When switch Q10 is on, a current discharged from the fifth capacitor C18 conducts through the first winding of the fly-back transformer T10 and the switch Q10; a current draw from the third capacitor C14 or fourth capacitor C16 conducts through the third diode D14, the fifth diode D18, the second winding of the fly-back transformer T12, the primary winding of the main transformer T12 and the switch Q10.

When switch Q10 is off, there is an induced voltage in the fly-back transformer T10, this voltage and input voltage force a current to charge the third capacitor C14 and the fourth C16 through the second diode D12, the first winding of the fly-back transformer T10 and the third diode D16.

The number of the windings of the first winding of the fly-back transformer T10 is about three times of that of the second winding of the fly-back transformer T10.

The second capacitor C12 is used to improve the input current waveform, when the input voltage is very low, the input current charges the second capacitor C12 instead the third capacitor C14 and the fourth capacitor C16.

The above-described embodiments of the present invention are intended to be illustrative only. Numerous alternative embodiments may be devised by those skilled in the art without departing from the scope of the following claims.

What is claimed is:

1. A single-stage power factor correction converter comprising of:
    a full bridge rectifier having:
    output terminals: a positive output terminal and a negative output terminal;
    input terminals being coupled to input power lines;
    a first capacitor coupled to the output terminals of the full bridge rectifier;
    a first diode, an anode of the first diode being connected to the positive output of the full bridge rectifier;
    a second diode; a cathode of the second diode being connected to a cathode of the first diode;
    a third diode, an anode of the third diode being connected to the negative output of the full bridge rectifier;
    a fourth diode;
    a fifth diode; a cathode of the fifth diode being connected to the cathode of the first diode;
    a fly-back transformer having two windings: a first winding and a second winding; the first winding of the fly-back transformer being coupled between an anode of the second diode and the positive output of the full bridge rectifier;
    a second capacitor, the second capacitor being coupled between the cathode of the first diode and the negative output of the full bridge rectifier;
    a third capacitor having a positive terminal and a negative terminal, the positive terminal of the third capacitor being connected to the cathode of the first diode and the cathode of the fifth diode, the negative terminal of the third capacitor being connected to an anode of the fourth diode and a cathode of the third diode;
    a fourth capacitor having a positive terminal and a negative terminal, the positive terminal of the fourth capacitor being connected to a cathode of the fourth diode and an anode of the fifth diode; the negative terminal of the fourth capacitor is connected to the negative output terminal of the full bridge rectifier;
    a main transformer having a primary winding and a secondary winding; the secondary winding of the main transformer being coupled to a secondary unit; the primary winding of the main transformer being connected to the second winding of the fly-back transformer in series;
    a switch having a first terminal, a second terminal and a control terminal; the second terminal being connected to the negative terminal of the fourth capacitor and the negative terminal of the full bridge rectifier; the control terminal of the switch being coupled to a control circuit unit;
    a series circuit of the second winding of fly-back transformer and the primary winding of the main transformer being coupled between the positive terminal of the third capacitor and the first terminal of the switch;
    a fifth capacitor being coupled between the anode of the second diode and the first terminal of the switch.

2. The single-stage power factor correction converter in claim 1, wherein the second winding of the fly-back transformer is connected in series with the primary winding of the main transformer, an energy through the second winding of the fly-back transformer is used to correct an input current waveform, the energy through the primary winding of the main transformer is transferred to the secondary winding of the main transformer.

3. The single-stage power factor correction converter in claim 1, wherein a fill-valley circuit, including the third diode, the fourth diode, the fifth diode, the third capacitor and the fourth capacitor, is used to store an energy from an input power during the switch in non-conductive state and to release the energy when an input voltage is lower than a voltage across the third capacitor or the fourth capacitor during the switch in conductive state.

4. The single-stage power factor correction converter in claim 1, wherein the second capacitor is used to improve an input current waveform.

5. The single-stage power factor correction converter in claim 1, wherein the first winding of the fly-back transformer and the first diode are used to charge the third capacitor and the fourth capacitor and improve input current waveform.

6. The single-stage power factor correction converter in claim 1, wherein the fifth capacitor is used to store an energy stored in leaking inductance of the main transformer during the switch in non conductive state and is used to reduce a voltage across the switch during the switch off moment.

7. The single-stage power factor correction converter in claim 1, wherein the first diode is used to pass an input power to the main transformer and the main transformer transfers the input power from a primary unit to the secondary unit.

* * * * *